United States Patent [19]

Swanson

[11] 4,273,225
[45] Jun. 16, 1981

[54] ELECTRICALLY OPERATED MAST FOR LASER-CONTROLLED LEVELLING SYSTEM

[76] Inventor: Carl R. Swanson, 204 S. "A" St., Tulare, Calif. 93274

[21] Appl. No.: 28,669

[22] Filed: Apr. 10, 1979

[51] Int. Cl.³ .............................................. B60K 41/20
[52] U.S. Cl. .......................................... 192/7; 192/9; 74/845; 188/67
[58] Field of Search .................... 192/4 R, 9, 138, 143, 192/7, 2; 188/166, 67; 74/845

[56] References Cited

U.S. PATENT DOCUMENTS

| 2,372,196 | 3/1945 | Grime | 188/67 |
| 2,449,773 | 9/1948 | Hargreaves et al. | 188/166 |

Primary Examiner—George H. Krizmanich
Attorney, Agent, or Firm—Julian Caplan

[57] ABSTRACT

Levelling systems (e.g., scrapers) are laser-controlled by use of a sending station emitting a rotating, pulsed, laser beam in a plane either horizontal or inclined relative to the horizontal and a receiving station at the scraper which has a mast carrying one or more sensors. The sensor signals either signal the operator to raise, lower or change the angle of the blade or control the blade by hydraulic or electric actuations. The same mast mounted on a scraper (with blade raised to inoperative position) or other vehicle may be used for surveying a field. It is necessary in either case to raise and lower the mast so that the sensor intercepts the laser signal. This has heretofore been done in various ways hydraulically, electrically or mechanically (e.g., worm drive). The present invention provides an electrically driven mast having a brake which opposes the tendency of other electrically operated masts to overtravel when descending, which tendency is attributable to the inertia resulting from the weight of the moving elements of the mast. The brake releases when the mast is being raised.

7 Claims, 6 Drawing Figures

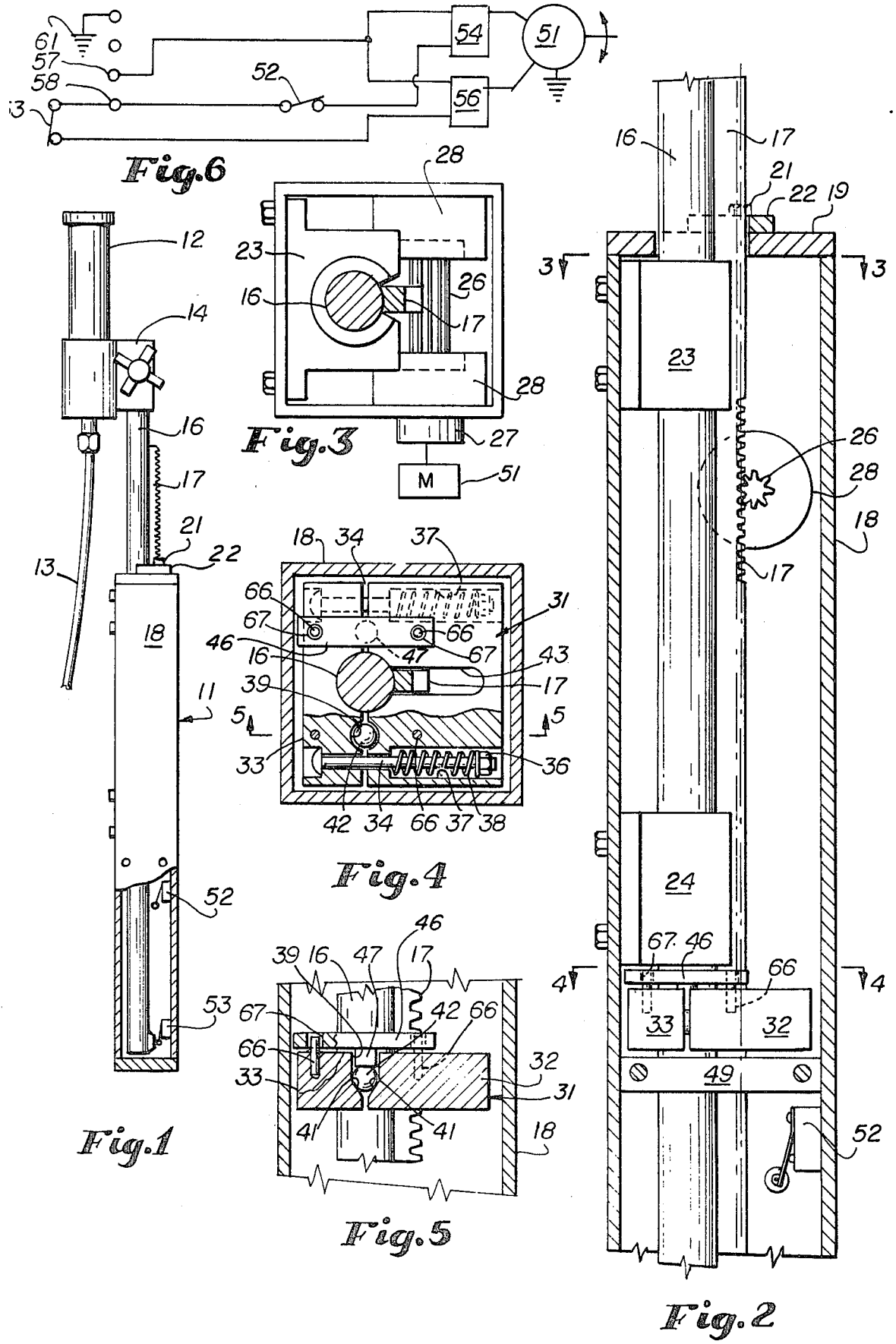

ELECTRICALLY OPERATED MAST FOR LASER-CONTROLLED LEVELLING SYSTEM

This invention relates to a new and improved electrically operated mast for laser-controlled levelling systems; and most particularly, to an automatic, adjustable brake which provides a drag on downward movement of the mast to eliminate over travel.

At present, laser instruments are used to control levelling equipment. In one common system, a laser beam is caused to rotate about an axis in a plane which may be horizontal or inclined at predetermined angles from the horizontal. An implement such as a scraper carries a mast having a sensor which intercepts the pulse of the laser beam. In order to intercept the pulse, it is necessary to provide means for raising and lowering the mast relative to the implement. The signal from the sensor may be used to control the implement—i.e., to raise or lower the blade of a scraper. For such purposes, the prior means for raising and lowering the mast may be adequate. However, in some instances, the working portion of the implement is held inoperative (e.g., the scraper blade is raised from contact with the soil) and the sensor is used to survey elevation of the terrain. In such instances, the movement of the implement is much more rapid than when it is excavating, and it has been found that means which are satisfactory for raising and lowering the mast for other purposes are unsatisfactory for surveying. The present invention relates particularly to such function of the mast elevating means.

One common means for raising and lowering the mast is a hydraulic system. However, such systems are susceptible to valve leakage which causes the mast to creep and thus to provide inaccurate survey information and mast creep during levelling mode. Where open center flow divider hydraulic systems are used, heat problems occur.

Mechanical means such as worms and screws to control mast elevation are too slow for use in surveying.

The ball screw type units have trouble controlling high rotational speeds and require high amperage motors. When they are geared for high speed for surveying, they cannot control in small dimensions (e.g., 0.01 feet) for normal adjustment of the mast for use in levelling. The rack and pinion in combination with worm gear drive of the present invention allows for use of low amperage motor types.

The present invention is particularly susceptible to an electric drive using a rack and a pinion driven by a reversible electric motor. Prior electric systems have been slow; the present system allows for rapid alterations in the elevation of the range of 0.01 feet in mast position read-out per laser beam pulse.

A particular problem in electric driven masts has been that on the downward movement of the mast the weight of the mast shaft and the equipment carried thereon inhibited rapid surveying. The present invention provides an automatic brake which opposes the weight of the mast and its load on descent of the mast and is released on ascent of the mast.

Inasmuch as there is a worm drive between the electric motor and the pinion which meshes with a rack on the mast shaft, the mast is held stationary when the motor is not turning.

Thus, the present invention provides an electric system for mast control which is rapid enough to be used in surveying and rugged enough for the extreme conditions of use encountered in excavating.

A further feature of the invention is the provision of limits which is to protect the mast shaft from over travel.

A still further feature of the invention is the direct line mount of the rack gear. This allows for mechanical read-out gearing or the mounting of an electrical read-out unit, all as will be well understood by one skilled in this art.

Other objects of the present invention will become apparent upon reading the following specification and referring to the accompanying drawings in which similar characters of reference represent corresponding parts in each of the several views.

In the drawings:

FIG. 1 is a schematic side elevational view of a mast and sensor of the type in which the present invention may be incorporated.

FIG. 2 is an enlarged vertical sectional view through a portion of the structure of FIG. 1.

FIG. 3 is a horizontal sectional view taken substantially along the line 3—3 of FIG. 2.

FIG. 4 is a horizontal sectional view taken substantially along the line 4—4 of FIG. 2.

FIG. 5 is a sectional view taken substantially along the line 5—5 of FIG. 4.

FIG. 6 is a schematic wiring diagram.

A typical mast 11 is illustrated in FIG. 1, such mast being mounted upon an implement such as a scraper by means not illustrated but well understood in the art. Mast 11 mounts a sensor 12 having a cable 13 which leads to a read-out and, optionally, to automatic controls for the excavating equipment. Sensor 12 is mounted by means of clamp 14 to the upper end of shaft 16 of the mast 11. An elongated rack 17 is fixed to shaft 16. Shaft 16 and rack 17 are caused to reciprocate relative to a casing 18 which is here shown of square mechanical tubing. The upper end of casing 18 has a cover 19 formed with an opening for the shaft 16 and rack 17 preferably having a guide 22 carrying a wiper 21 which prevents dust from entering the casing 18 and prevents unnecessary escape of lubricant.

Mounted inside casing 18 are top bearing 23 and center bearing 24 spaced below the same. Bearings 23, 24 are preferably open pillow block linear ball bearings. A typical suitable bearing is Thomson ball bushing SPB-16-OPN.

Meshing with rack 17 and positioned below bearing 23 is pinion 26 which is connected by coupling 27 through a conventional worm and screw drive (not shown) to electric motor 51. The ends of pinion 26 are mounted in internal bearings 28. The motor 51 and electric system are hereinafter described, but it will be understood that the motor is reversible and by reason of the worm and worm wheel drive is locked in place when not energized.

The present invention relates particularly to brake 31 mounted within the casing 18 immediately below center bearing 24. Brake 31 consists of a block 32 and a split block 33, the two blocks being split along a vertical plane through the axis of shaft 16 and releasably moving with shaft 16, as hereinafter explained. Extending between blocks 32 and 33 are horizontal headed pins 34 which span the gap between the blocks. The end of each pin 34 is threaded and carries a nut 36 within a bore 37 in block 32. A coil spring surrounds pin 34 and is interposed between the bottom of bore 37 and nut 36.

By tightening and loosening nut 36, the force of spring 38 may be adjusted and thereby, as hereinafter explained, the drag of the brake 31 adjusted.

A hole 39 is formed in the meeting edges of blocks 32, 33, and the bottom of hole 39 is formed with a downward converging taper 41. Within the hole 39 is a steel ball 42. As is particularly apparent in FIG. 4, a keyhole shaped opening 43 is formed in blocks 32 and 33 for passage of shaft 16 and rack 17. The force of springs 38 draws the blocks 32 and 33 together and the rounded portions of the keyhole 43 bear against the shaft 16 and create a drag which inhibits overtravel of the shaft 16. Such drag is adjustable by adjustment of the position of nuts 36, as has been explained.

To release the brake 31 on upward travel of shaft 16, a release is provided. The preferred form of release shown, particularly in FIGS. 2 and 5, is a pair of transverse horizontal bars 46 fixed to shaft 16 having on their lower surfaces plungers 47 which fit into the holes 39. Roll pins 66 fit into the top surfaces of blocks 32, 33 and extend into oversize holes 67 in bars 46 to maintain bars 46 in position. Normally, there is a gap between the bottom of each bar 46 and the top of blocks 32, 33. However, when the mast is moving upwardly, the bars 46 intercept the underside of the bearing 24, pushing the bars 46 down toward the blocks 32, 33, the plungers 47 depressing the balls 42 and spreading the blocks 32, 33 apart against the force of the springs 38, releasing the drag on the shaft 16. Stationary bottom bars 49 limit downward travel of the brakes 31.

A typical electrical circuit is shown in FIG. 6. Reversible DC electric motor 51 is energized from a battery 61 or from the electrical system of the implement on which the mast 11 is mounted. Upper and lower limit switches 52, 53 are mounted inside the casing 18 and are contacted by the mast on its upward and lower travel, the switches being normally closed but opening to de-energize the motor 51 when the mast has reached the limit of its travel. The direction of movement of motor 51 is controlled by up and down relays 54, 56 connected through the switches 52, 53, respectively, to the up and down controls 57, 58, respectively, which are connected to the laser control box of the implement.

Thus, in use, when the device is used in surveying, the operator drives the implement over the terrain noting manually or automatically elevation of the implement at various points. Controls not shown, but well understood in the art, and connected to terminals 57 and 58 are energized by the position of the plane of a laser pulse relative to the sensor 12, and these cause the motor 51 to turn the pinion 26 to raise and lower the mast shaft 16 to center the sensor 12 relative to the beam plane, all as well understood in this art. When the pinion 26 drives the rack 17 to raise the shaft 16, the bars 46 are in contact with the underside of bearing 24; and as the brake 31 tends to rise, the plungers 47 cause the balls 42 to spread the blocks 32 and 33 apart, releasing any drag which the brake 31 may have on the shaft 16 and permitting free travel of the shaft 16. When, however, the controls cause the pinions 26 to lower the shaft 16, the brake 31 is lowered so that the bars 46 are no longer in contact with the bearing housing 24. The springs 38 draw the blocks 32, 33 toward each other (the balls 42 being elevated by the tapered surfaces 41) and a sufficient drag is imposed on the shaft 16 to prevent over travel. The bars 49 prevent downward movement of brake 31 and insure plungers 47 remain within the holes 39.

What is claimed is:

1. A mast construction for a laser sensor comprising a casing, a shaft substantially vertically reciprocable in said casing and adapted for attachment of a laser sensor on its upper end, mounting means on said casing for said shaft, a rack on said shaft, a pinion rotatably mounted in said casing meshing with said rack, means for rotating said pinion in both directions to raise and lower said shaft and a brake in said casing engageable with said shaft and arranged to impose a drag on the descent of said shaft, said brake comprising first means and second means releasably movable with said shaft having an operative position with said first and second means engaging said shaft and an inoperative position, biasing means biasing said first and second means toward operative position and brake actuating means operable to overcome said biasing means and move said first and second means to inoperative position when said shaft is being raised by said pinion.

2. A construction according to claim 1 in which said brake actuating means comprises an abuttment stationary in said casing, abuttment engaging means fixed to said shaft on the upper side of said first and second means positioned to engage said abuttment when said brake tends to rise with said shaft, and spreader means on said abuttment engaging means shaped to spread said first and second means apart.

3. A construction according to claim 2 in which said first and second means comprise a first and second block opposed and separated along a vertical plane through said shaft and apertured for passage of said shaft and said rack, said biasing means operating to pull said blocks together to engage said shaft, said spreader means forcing said blocks apart.

4. A construction according to claim 3 in which said blocks are formed with substantially semi-cylindrical grooves facing said vertical plane, the lower ends of said grooves tapering inward, said spreader means comprising a ball in said grooves, and said abuttment engaging means being formed with a depending plunger positioned to depress said balls against said lower ends of said grooves and thus to wedge said blocks apart when said abuttment engaging means engages said abuttment.

5. A construction according to claim 4 which further comprises a stop on said casing below said brake means to limit downward movement of said brake.

6. A construction according to claim 3 in which said biasing means comprises a pin spanning the space between said blocks and a spring associated with said pin to pull said blocks together.

7. A construction according to claim 6 in which the force of said spring is adjustable.

* * * * *